(12) United States Patent
Burns et al.

(10) Patent No.: US 6,775,703 B1
(45) Date of Patent: Aug. 10, 2004

(54) LEASE BASED SAFETY PROTOCOL FOR DISTRIBUTED SYSTEM WITH MULTIPLE NETWORKS

(75) Inventors: Randal Chilton Burns, Sunnyvale, CA (US); Atul Goel, San Jose, CA (US); Darrell D. E. Long, Soquel, CA (US); Robert Michael Rees, Los Gatos, CA (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 09/562,510

(22) Filed: May 1, 2000

(51) Int. Cl.[7] .................... G06F 15/16; G06F 15/173; G06F 12/00
(52) U.S. Cl. .................... 709/228; 709/223; 709/224; 709/225; 709/226; 709/227; 709/229; 711/150; 711/154
(58) Field of Search .................... 709/220, 221, 709/222, 223, 225, 226, 228, 232, 238, 210, 227, 224; 713/200; 711/148, 147, 150, 153, 154

(56) References Cited

U.S. PATENT DOCUMENTS

| | | | | | |
|---|---|---|---|---|---|
| 5,996,075 | A | * | 11/1999 | Matena | 713/200 |
| 6,192,483 | B1 | * | 2/2001 | Moiin et al. | 709/221 |
| 6,243,814 | B1 | * | 6/2001 | Matena | 713/200 |
| 6,449,641 | B1 | * | 9/2002 | Moiin et al. | 709/220 |

* cited by examiner

Primary Examiner—Paul Kang
(74) Attorney, Agent, or Firm—Marc D. McSwain; Mark C. McCabe

(57) ABSTRACT

A system, method, and computer program product for a lease-based timeout scheme that addresses fencing's shortcomings. Unlike fencing, this scheme (or protocol) enables an isolated computer to realize it is disconnected from the distributed system and write its dirty data out to storage before its locks are stolen. In accordance with the invention, data consistency during a partition in a distributed system is ensured by establishing a lease based protocol between in the distributed system wherein a client can hold a lease with a server. The lease represents a contract between a client and a server in which the server promises to respect the client for a period of time. The server respects the contract even when it detects a partition between the client and itself.

3 Claims, 7 Drawing Sheets

LEASE BASED SAFETY PROTOCOL FOR DISTRIBUTED SYSTEM WITH MULTIPLE NETWORKS

BACKGROUND OF THE INVENTION

1. Field of the Invention

The present invention relates in general to distributed file systems, and more specifically, to a lease based safety protocol for distributed systems with multiple networks.

2. Description of Related Art

Distributed file systems have increasingly become the principal means for data sharing in distributed applications. A distributed file system presents a local file system interface to remote and shared storage, sheltering the programmer from problems that arise in synchronizing access to data and ensuring the consistency of data across many computers. The Andrew File System (AFS) and its successor the Decorum File System (DFS) expanded the client-server file system concept to distributed file systems by enhancing security and scalability as well as providing a uniform global name space for all clients. As programmers understand local file system semantics well, the distributed file system is easy to use when compared to message passing or network programming models.

In addition to data sharing, distributed file systems commonly centralize storage, which improves both the scalability and manageability of storage systems. If each computer has its own local storage, resources are fragmented across an installation. Some computers may underutilize storage while others have full disks. However, if all storage resources are pooled, they can be shared at a fine granularity. This centralized deployment also allows an administrator to easily replace devices, perform centralized backup, and manage heterogeneous storage hierarchically, e.g. a pool of disks that overflow onto a tape library.

Recent research has focused on achieving scalability and performance for distributed file systems by removing the bottleneck of a centralized file server. One approach is to remove the server bottleneck by removing the server. File systems for parallel computers take this approach as does the xFS serverless file system and JetFile system for networks of workstations.

One way of enabling clients to efficiently share storage without centralizing it behind a server is by using a storage area network (SAN). In a SAN, many computers share access to network attached storage devices. For distributed file systems built on a SAN, clients and servers can share access to all file system data. Examples of SANs include Fibre Channel (FC) networks and IBM's Serial Storage Architecture. SAN's which make network attached storage devices available on general purpose data networks like Gigabit Ethernet have also been contemplated. A distributed file system built on a SAN can remove the server bottleneck for I/O requests by giving clients a direct data path to disks.

For exactly the same reason that distributed file systems are easy to use, they are difficult to implement. The distributed file system takes responsibility for providing synchronized access and consistent views of shared data, shielding the application from these tasks, but moving the complexity into the file system. One such problem arises when a computer that holds locks to access data becomes isolated. An isolated computer is either in a network partition or has crashed and the locks held by the isolated computer are in an unknown state. The problem arises in that the remainder of the distributed system cannot differentiate between a crash and network partition.

A crashed computer is no longer able to use its locks and the locks can safely be given to other clients. However, unlike a crashed computer, a computer in a network partition may still have access to network attached storage devices and could potentially use its locks. This occurs in particular when message traffic and data traffic are performed on different networks—message traffic on an IP network and data traffic on the SAN. Computers in a partition could still be writing data and giving other clients new locks on this data. This sacrifices data consistency and the structural integrity of an object storage system. One known solution to this problem is to fence the isolated computer, instruct the storage device to no longer take requests from the isolated computer, and steal the computer's locks, assume them invalid and redistribute them to other computers.

While fencing is a generally accepted solution it can be inadequate for data sharing environments. Computers cache data, and any unwritten data in the cache must reach a storage device to guarantee sequential consistency within a distributed system that shares storage devices. Fencing an isolated computer prevents cache contents from reaching disk, but does not prevent a client computer from continuing to operate on cached data without correctly reporting errors locally.

II. SUMMARY OF THE INVENTION

The present invention provides a lease-based timeout scheme that addresses fencing's shortcomings. Unlike fencing, this scheme (or protocol) enables an isolated computer to realize it is disconnected from the distributed system and write its dirty data out to storage before its locks are stolen. In accordance with the invention, data consistency during a partition in a distributed system is ensured by establishing a lease based protocol between in the distributed system wherein a client can hold a lease with a server. The lease represents a contract between a client and a server in which the server promises to respect the client for a period of time. The server respects the contract even when it detects a partition between the client and itself.

III. BRIEF DESCRIPTION OF THE DRAWINGS

The present invention will be described by reference to the drawings, in which.

IV. DETAILED DESCRIPTION OF THE PREFERRED EMBODIMENT

A distributed file system built on a SAN, where clients access data directly from the SAN devices, is shown in FIG.

1. Servers 102, 104, 106 each perform the functions of serving file system metadata, synchronizing access to file objects, and keeping distributed views of the same data consistent through cache locks. Additionally, many servers may act in concert, as a server cluster 108, to provide load balancing, scalability, and takeover on system failure. The SAN environment simplifies the file system and radically changes its performance characteristics. Previously, distributed file system servers transmitted data and performance was limited by I/O bandwidth. In the SAN environment, without any data to serve, a server's performance is measured in transactions per second, analogous to a database server answering queries on metadata and lock state.

SAN 110 connects clients 112, 114, 116 and server cluster 108 to shared storage resources such as disk drives 118, 120 and tape storage systems 122. In addition to synchronizing access, server cluster 108 manages allocation and placement of data on this network, but clients perform all I/O directly. Server cluster 108 also has private storage (not shown) for metadata and lock state databases. The hardware and operating system software of the clients in this system are heterogeneous, and the server shares data among many platforms. The server also includes a central data management function, packaged inside server cluster 108, that performs tasks such as backup and restore, archival, and hierarchical storage management.

Advantageously, the server provides the data sharing, scalability and management benefits of a distributed file system, while maintaining the performance of a local file system. Clients access file data directly from the network at speeds equivalent to local data busses. SAN 110 connects all clients and servers to all storage resources, allowing servers to manage storage devices, even though they are not in the file system I/O path.

Figure 1:
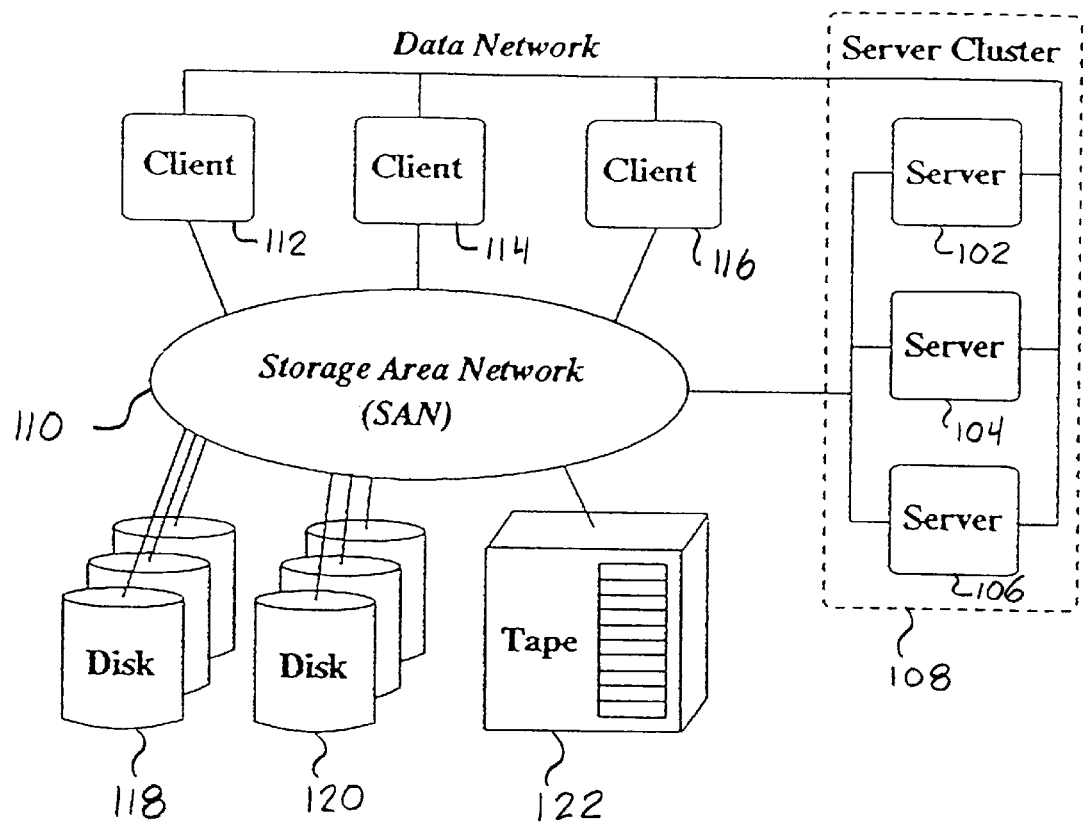
FIG. 1 is a schematic of the present distributed file system on a Storage Area Network.
Figure 2:
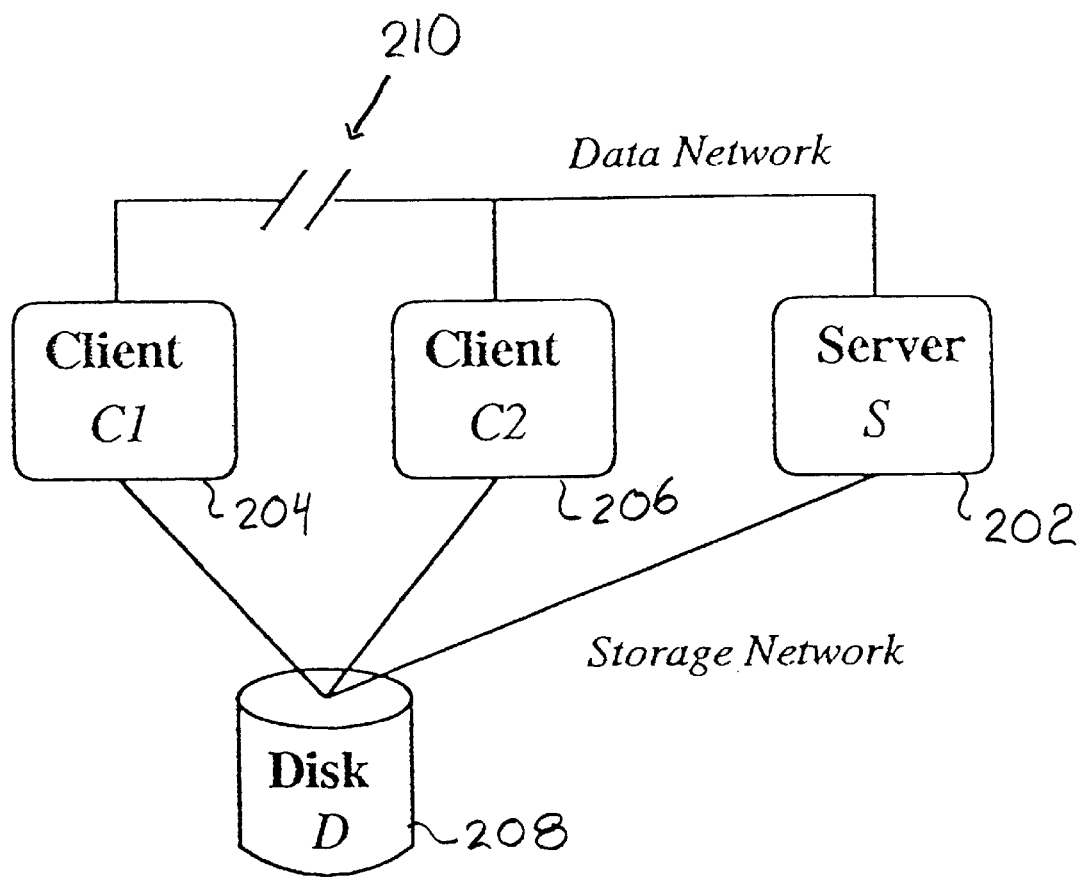
FIG. 2 is an example of a two network storage system with a partition (break) in the general purpose data network.

Due to the differences between the SAN environment and other distributed environments, the present server addresses a different class of problems for maintaining data consistency in the presence of failure. Much of the prior art work assumes that network partitions always form symmetrically. In contrast, the present server uses two networks, a general purpose network for control operations, and a SAN for data traffic. Computers, clients, and servers, communicate with each other on the data network. Anytime a partition, symmetric or otherwise, forms in either network, the two networks considered together partition asymmetrically. If the SAN is partitioned then two clients that contain each other in their network view have different views of the SAN. Similarly, if the data network partitions, the disk can see all clients, but all clients cannot see each other. With two networks, a symmetric partition in one network results in an asymmetric partition across both. The conventional protocols for dealing with asymmetric partitions typically require all participants to run the protocol. In the SAN environment, however, the storage device may be a disk drive which does not have a general purpose processor on which to run the protocol. Despite significant support for distributed processing on active or intelligent disks with general purpose computation engines these devices are still not broadly commercially available if at all. Conventional disk drives on a SAN typically cannot download code and consequently cannot maintain views and send data messages that are not I/O channel commands. A simple example suffices to show how asymmetric partitions and the limited capabilities of disk drives result in data consistency problems when a network becomes partitioned as shown in FIG. 2. As used in this document "partitioned" refers to a state where one portion of the network becomes isolated from the rest. For example, a client may become isolated from the remainder of the network due to a hardware failure, an operating system state, or any other cause that results in a failure of message exchange between the two.

Assume a small SAN installation consists of a server 202, two clients 204, 206 and a single disk drive 208. Let one client have an open instance with a data lock that permits it to read and write a file. After the first client (C1) obtains the lock, the data network becomes partitioned 210. Server and the other client (C2) can no longer see C1. If C2 requests permission to write the same file, server 202 cannot demand the lock since it cannot communicate with C1. Server 202 also cannot instruct disk drive 208 to deny service to C1, as disk drives can only service I/O channel commands. The partition results in server 202 denying C2 access to the file. Granting access to C2 would result in multiple writers without synchronization of writes. Caches would be incoherent and data integrity lost.

Without a suitable safety protocol, when a client enters a partition holding a locked file, no other client can access that file until the partitioned client reappears on the network. Something as simple as a network partition can render major portions of a file system unavailable indefinitely.

Adding the ability to fence clients, instructing a disk drive to deny service to particular initiators, does not solve data integrity and cache coherency problems in a data sharing SAN storage system. Returning to the previous example (FIG. 2), if disk drive 208 supported fencing, server 202 could instruct it to not allow C1 to perform any I/O. Then, server 202 could grant C2 write access to the file and any processes on C2 accessing this file would have data integrity guarantees and see a sequentially consistent file. However, caches are inconsistent and processes running on C1 can behave incorrectly. C1 does not receive invalidation messages for its data lock when C2 opens the file for writing. After C2 writes data, the cache contents of C1 are incorrect. If C1 has not tried to contact server 202 or tried to perform I/O, it has no knowledge that its lock is invalid. Local processes on C1 could read the bytes recently written by C2 and receive an old copy of the data. The existence of a cache at the client thus renders fencing ineffective in providing cache coherency and data consistency.

Even if clients can determine when they are fenced, written data can be lost.

File systems rarely write data to disk immediately when receiving a write from a local process, i.e. most file system caches use a write-back policy. Instead, writes are cached to be performed in batches at a later time. A client has no warning before being fenced and cached writes would be stranded on the client, never making it to disk. Interestingly, when a local process writes data to the cache, the client file system returns an error code indicating success. The file can then be closed and the process terminated. A write that makes it to the cache but not to disk reports success to a local process. When the error occurs, the writing process might not exist.

While fencing can ensure that clients in the server's and disk's network view have synchronized and consistent access to data, it does not provide data consistency to all clients. Clients cannot always determine immediately when they are in a network partition and can potentially continue operations on a stale cache and can also lose written data.

In light of the above, the present system includes a safety protocol that protects the integrity of data and guarantees cache coherency. The protocol is embodied as program instructions and data structures which, in the system of FIG.

1, are stored in the memory of each of the servers. The program instructions can be delivered, for example, over a communications network or by way of program product instantiated on a computer readable magnetic, optical or hybrid media. It should be understood that alternatives, such as having the program logic for the protocol embedded in an integrated circuit (e.g. an application specific integrated circuit) may also be used. The protocol protects the contents of a file by preventing isolated clients from writing data to disk and allow isolated clients to determine that they are out of communication with a server so that they can discard their cache. The protocol is based on leases, as defined in the V operating system at Stanford, that allow clients to determine that they have become isolated from the server. Upon determining their isolation, clients have the opportunity to write dirty data to disk before discarding their cache contents. In addition to data consistency guarantees, the present lease-based safety protocol has performance advantages. These include optimizations that eliminate message traffic during normal operation and a design that allows a passive server that participates in the protocol only when a network error occurs.

The goal of the protocol is to ensure data integrity and cache coherency among clients accessing network attached storage devices. To this end, the protocol addresses arbitrary partitions in the data network, including asymmetric partitions. In support of the protocol, the clients and servers are provided with clocks that are rate synchronized with a known error bound. The protocol operates in a connection-less network environment, where messages are datagrams. Still, many messages between the client and the server are either acknowledged (ACK) or negatively acknowledged (NACK) and include version numbers so that "at most once" delivery semantics with delivery failure errors can be guaranteed.

Figure 7:
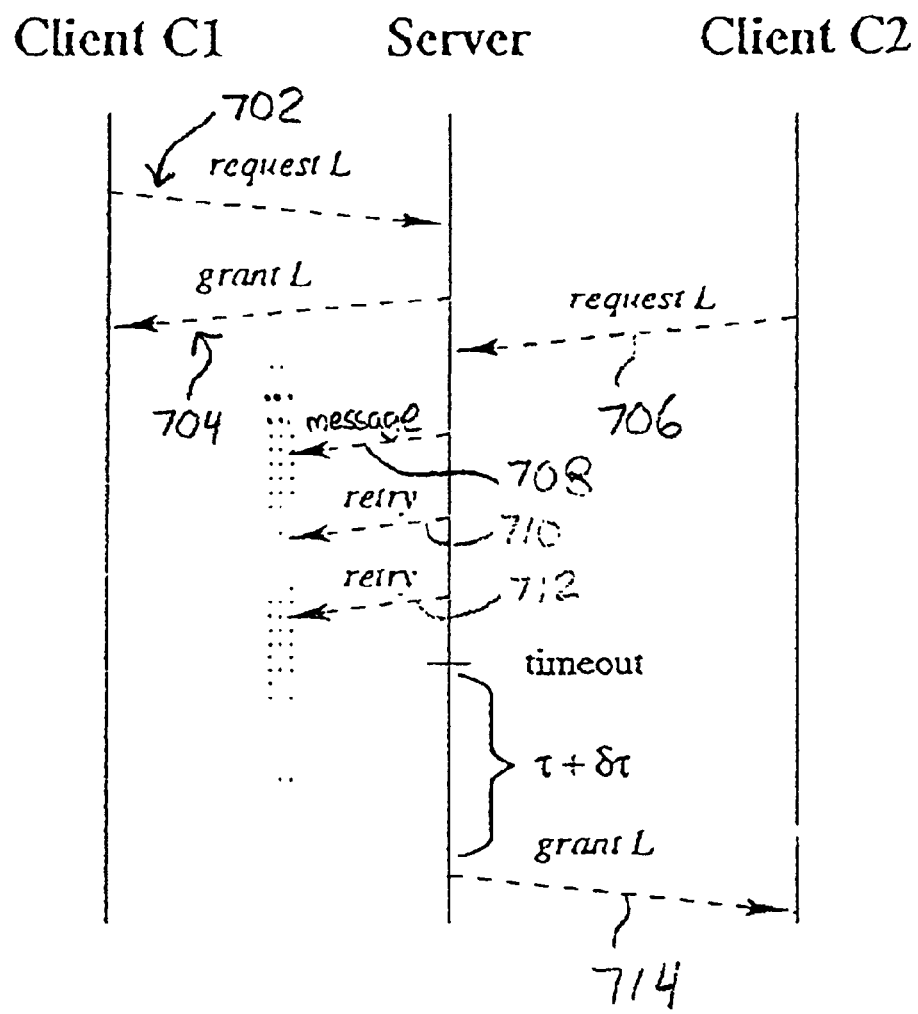
FIG. 7 is a flow diagram illustrating a server's use of a lease to time-out client locks.

A lease in this protocol represents a contract between a client and a server in which the server promises to respect the client's locks (and any other state the client has) for a specified period of time. The server respects the contract even when it detects a partition between the client and server. A client must have a valid lease on all servers with which it holds locks and any cached data on a client become invalid when the lease expires. Servers use the lease to time-out client locks. The basic protocol for accomplishing this is illustrated in FIG. 7. Assume that a first client C1 has requested 702 and been granted 704 a lock L. Further assume that after grant 704, another request 706 for the lock L arrives at the server from another client C2. If the server attempts to send a message 708 that requires an ACK from a client and the client fails to respond, the server assumes the client to be failed, either isolated in a partition or crashed by hardware failure or software error. A failed delivery includes several retries 710, 712. At this point, the client has missed a message and its metadata cache may be in an inconsistent state. Like local file systems, metadata are only guaranteed to be weakly consistent. In other words, modifications to metadata by one process are guaranteed to be reflected on the metadata view of another process eventually, but no instantaneous consistency guarantee exists. Thus, missing a metadata message is not yet a data consistency problem. The data the client caches are still strongly consistent and protected by held data locks. After the server determines that the delivery has failed, it starts a timer that goes off at a time t+dt later, where t is the contracted lease period. The server knows that t+dt represents a time of at least t at the client. Once the server waits out this timer, it may steal the locks from the first client C1 (and thus grant them 714 to the other client C2). The first client C1 is responsible for ensuring that all dirty data are written out by this time and that the data and metadata it caches with respect to this server are invalid.

For the server's decision to steal locks having waited time t+dt to be correct, the client must expire its lease before that occurs in absolute time. Because clocks are relatively synchronized by a factor of d, a client whose lease starts before the server starts counting provides an equivalent guarantee. Since the present system does not keep an absolute time, it uses ordered events, a client to server message and the server ACK, to ensure that a server timer begins after the last lease that a client obtained.

Figure 3:
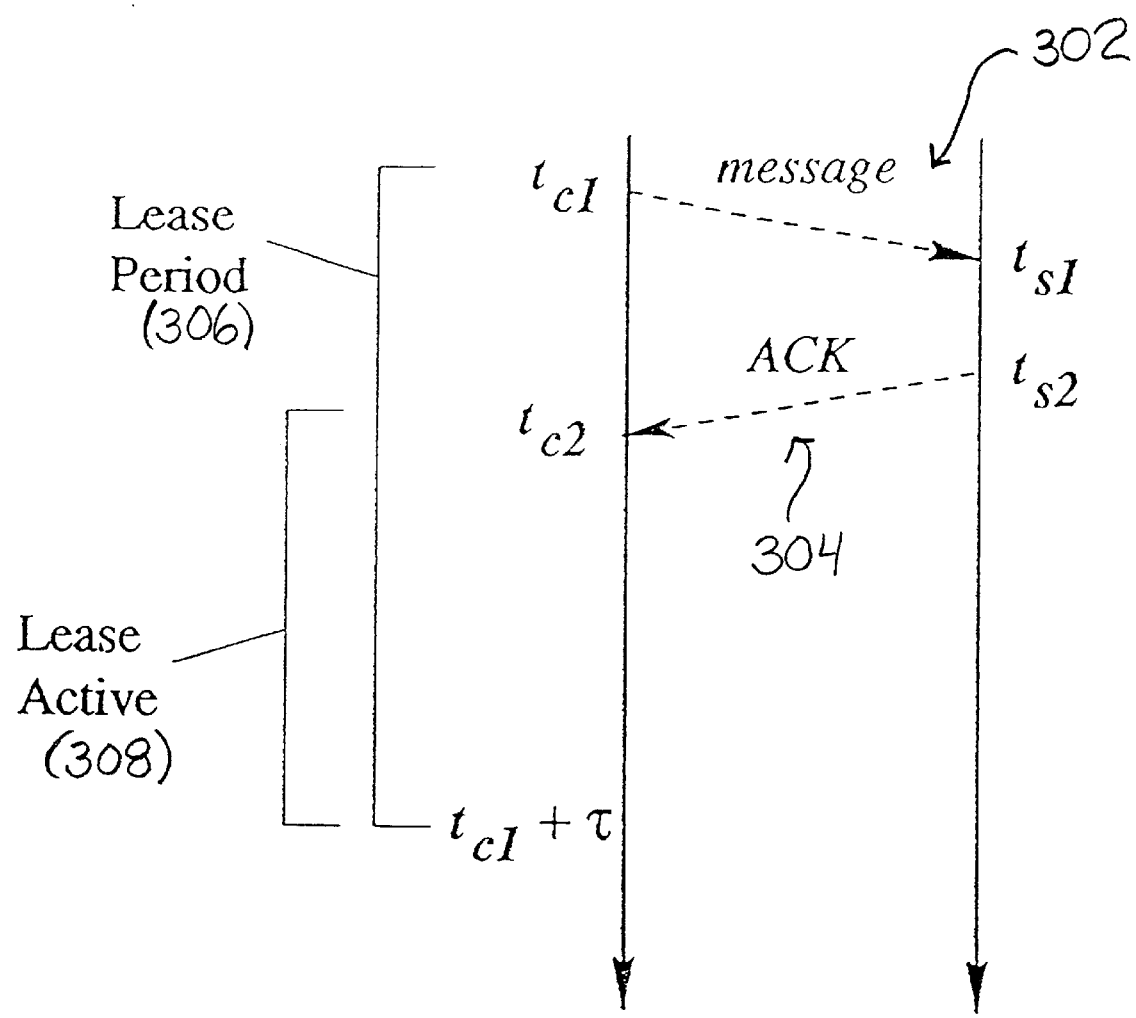
FIG. 3 is a flow diagram of a process for obtaining a lease.

A client obtains or renews a lease with a server on every message it initiates. The lease period begins when the client transmits, but the client cannot use the lease until it receives the server response. This process is shown in more detail in FIG. 3.

At $t_{c1}$, the client sends a message 302 to the server. The server receives this message at $t_{s1}$ and acknowledges receipt (with an ACK 304) at $t_{s2}$. Without synchronized clocks, the client and server have an absolute ordering on events where $t_{c1} \leq t_{c2}$. Upon receiving the ACK at $t_{c2}$, the client obtains a lease valid for the period $[t_{c1}, t_{c1}+t]$. This lease's period 306 starts from when the client initiates the message, not when it receives the ACK, as initiating the message is known to occur before the server's reply. While this lease validates client actions from $[t_{c1}, t_{c1}+t]$, it activates when the client receives the ACK and is good for the period $[t_{c2}, t_{c1}+t]$. This is illustrated by the "lease active" period 308 of FIG. 3. For correctness, the server is required not to ACK messages if it has already started a counter to expire client locks. This ensures that the server cannot steal locks from a client until at least time $t_{s2}+t_{c1}+dt$ which will be after the client lease expires.

Clients do not obtain leases when servers initiate communication with a client because the client cannot safely choose a point in time at which the lease starts, i.e. the client knows no event that precedes the server message, because the client did not initiate the exchange. A client obtains a new lease on every acknowledged message that it initiates. In this way, clients opportunistically renew leases with regular storage tank messages to read and write metadata and obtain locks. For regular operation, clients send no additional messages. An extra protocol message is also provided, with no metadata or lock function, for the sole purpose of renewing a lease. Clients that do not already have leases use this message, as do clients that have quiesced, are no longer active, but still cache data and hold locks.

Figure 4:
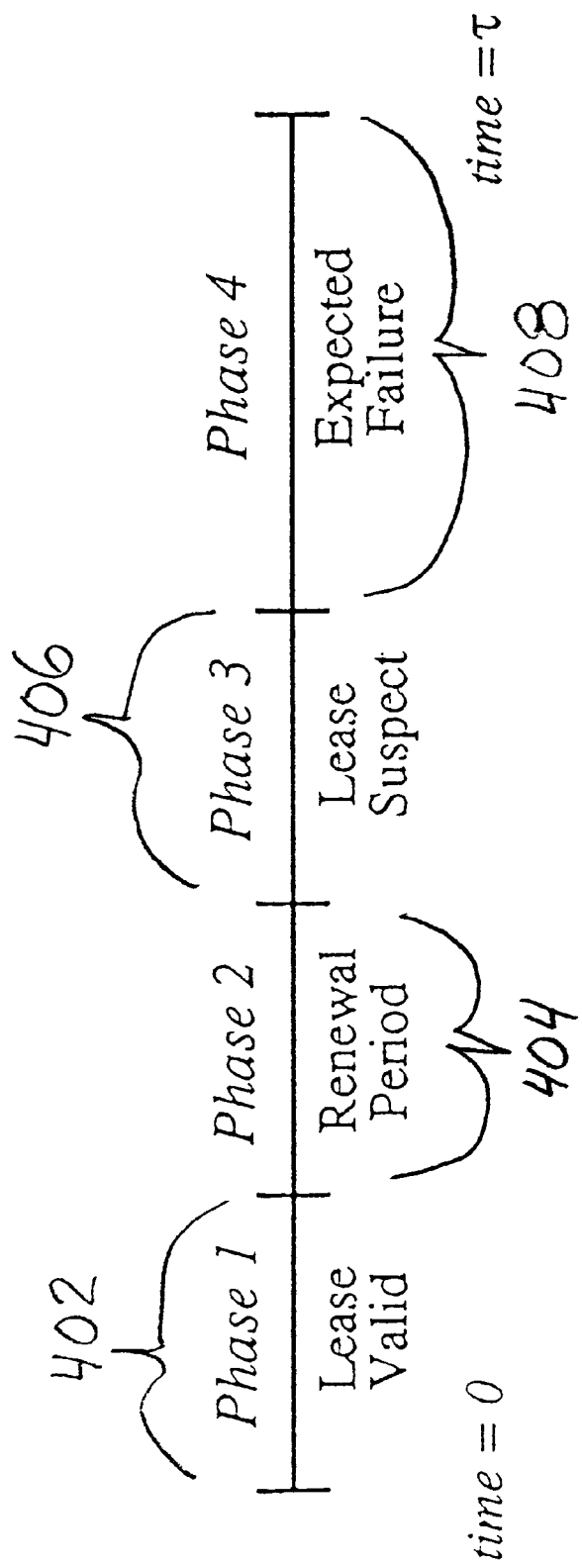
FIG. 4 is a time line illustrating the four phases of the lease period in a client.

The client subdivides the lease period into multiple phases in which it conducts different activities consistent with its lease contract with a server. Specifically, the client breaks down its lease into four phases as shown in FIG. 4.

In the first phase (phase 1) 402, a recently obtained lease protects access to all data objects locked on that server. Local processes request data read and writes and object open, close, get attributes, etc., which the client performs. Any new message ACK received during this period renews the client lease. For this reason, an active client spends virtually all of its time in phase 1 of the lease protocol. If a client does not receive a message acknowledgment in phase 1, which may be because it is inactive and not initiating communication with a server, the client actively tries to obtain a new lease in the second phase (phase 2) 404. To do this, the client uses a special purpose keep-alive protocol message. Unlike all other protocol messages, the keep-alive message encodes no file system or lock operations. The keep alive message is merely a NULL message requesting an ACK from a server. In this second phase of the lease period, the client continues to service file system requests on behalf of local processes.

A client that fails to attain a lease in the second phase assumes that it is isolated from the server. Its active attempts to reobtain a lease have failed. In the third phase (phase 3) 406, the client stops servicing file system requests on behalf of local processes. In-flight file system transactions continue until the end of the phase. The purpose of this phase, holding back new requests and continuing started operations, is to quiesce file system activity. The client optimistically assumes that in the future it will recover its current lock state and file open state and continue file system processing without error, and therefore continues current operations. On the expectation that they would not complete before the lease expires, the client holds back new requests. At the end of phase 3, all actions against the files in question are stopped.

In the fourth phase (phase 4) 408, any dirty pages protected by locks held with the server for which the lease expires are flushed out to disk. By the end of phase 4, no dirty pages should remain. If this is true, the contents of the client cache are completely consistent with the storage system.

After the lease expires at the end of phase 4, the lease and its associated locks are no longer valid. The server can steal the client's locks and redistribute them to other clients interested in the files. Assuming that the client successfully completed all transactions in phase 3 and finished writing out data in phase 4, sequential consistency for file data is preserved in the presence of either a server crash or partition in the data network.

Preserving sequential consistency depends on the client having enough time to complete transactions and write dirty data. However, the time spent waiting for client leases to expire leaves file data locked by that client unavailable to other clients. A compromise between availability and consistency, as well as knowledge of the expected failure, influence good choices for the length of the four phases in the client lease protocol.

The server expects several categories of failure. Transient network failures arising from lost packets, routing errors, or other causes should last less than a second. Software faults generally result in either the program or operating system being restarted and almost always last tens of seconds. Hardware faults, including network hardware, last for hours or days. Choosing the shortest lease period possible is desirable for availability, but this period should be constrained by network parameters and the time required to flush dirty data to SAN attached storage.

During normal operation, most UNIX file systems synchronize data with disk drives every 30 seconds. For a file system that never builds up more than a 30 second back log of writes to perform, 5 seconds should be more than adequate to get all data to disk. Choosing phase 4 to be 5 seconds gives the client time to write out data. In general, choosing an interval of a second for each phase, allows the duration of each phase to be significantly longer than message retry timeouts, message round trip time, and transient network partitions. Phases 1, 2, and 3 are chosen to be this length. While one second is very generous, squeezing out partial seconds in the early phases would be a false optimization when 5 seconds are required for data writing. Also, the longer the duration of phase 1, the more often the client renews its lease without a message. When this occurs, the lease protocol incurs no operational overhead on the network.

While the foregoing times are given as examples it should be understood that the actual values of the time intervals need to be chosen carefully depending upon the actual performance of the distributed system.

Transient failures and communication errors result in a client that believes it is active, operating on valid leases, communicating with a server that is in the process of stealing that client's locks. For correct operation, this asymmetry must be detected and addressed in the lease protocol. From the server's perspective, once the client has missed a message, the cache of that client is invalid. While the server needs to respect the client's locks for a lease interval, the server intends to take action that renders the client cache incoherent. For example, if the client misses a lock revocation message, the server intends to grant a lock that conflicts with the current client clock state.

Figure 5:
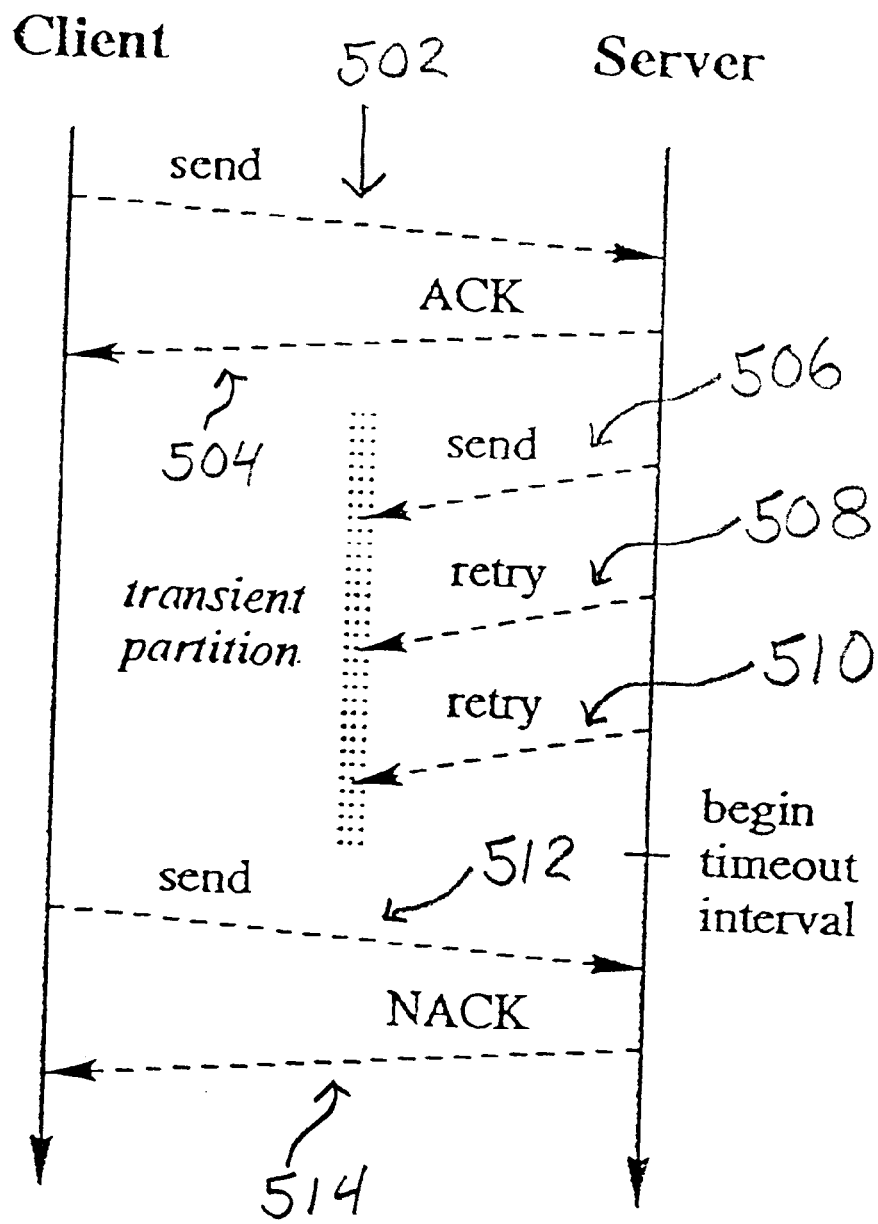
FIG. 5 is a flow diagram illustrating the interaction between a client and a server where having started the process of revoking a client lease, the server negatively acknowledges client requests to prevent renewal of the clients lease.

A client that experiences a transient network partition may miss a message and recovers communication with a server without knowing it missed the message. This situation is illustrated by way of example in FIG. 5. Assume that a client has been in communication with the server (e.g. it has sent a message 502 and received an acknowledgment 504 from the server) just before the occurrence of a transient partition. During the period of the transient partition the server unsuccessfully attempts to send a message 506 followed by a number of retries 508, 510. After the transient partition has been remedied, the client sends a new request 512 to the server. The server can neither acknowledge the message, which would renew the client lease, or execute a transaction on the client's behalf. Ignoring the client request, while correct, leads to further unnecessary message traffic when the client attempts to renew its lease in phase 2. Instead the server sends a negative acknowledgment (NACK) 514 in response to a valid request from a suspect client. The client interprets an NACK to mean that it has missed a message. It knows its cache to be invalid and enters phase 3 of the lease interval directly. The client, aware of its state, forgoes sending messages to acquire a lease and prepares for recovery from a communication error.

Servers in the present system retain the messages that the client misses until it completes the lease period timeout. After sending the NACK to the client, the server follows it up with the missed messages, which corrects the client cache state. By retransmitting missed messages, cache state can be repaired rather than recovered. The server's policy is to assume that a client will recover until the timeout actually occurs. This allows a client to repair its state at any time up until the server completes a timeout. When a lease expires, the client records that its cache is in question and ceases using cached data protected by locks held under the lost lease. However, the client does not discard the cache on the hope that it can be repaired or that locks may be reasserted.

By implementing a data safety protocol in a distributed system using leases, the present system protects the consistency of data without hardware support and at little or no runtime cost during normal operation. Unlike hardware based fencing, this approach addresses cache coherency as well as data consistency, even for isolated computers, allowing them to report errors correctly. The present system reduces the overhead associated with a lease-based safety protocol by both obtaining leases opportunistically and requiring no server processing during regular operation. A client renews leases opportunistically, at no additional message cost, by obtaining a valid lease for every ACK to regular metadata or lock client/server message. The server need only interact with the lease protocol when the delivery system reports that a client missed a message. Also, the server does not need to maintain a record of which clients have outstanding leases. This information is held implicitly by extant lock state.

As previously discussed, the lease protocol protects the consistency of cache contents in a distributed system. A client that has lost a lease can be assumed to have missed the server messages that keep its cache contents coherent with other clients and the server state. Not all of the client's cache contents are invalid, only those items in its cache that have been modified or deleted. Since the clients of a distributed file system can be expected to perform little data sharing in practice, the majority of the cache contents are coherent with the system state. The present system thus also includes a protocol for reasserting data locks in which clients retain the coherent portion of the cache and discard the remainder. For all data objects in the cache that have not been modified during the period in which the client held no lease, the lock the client held when its last lease timed out can be reinstated. In the present protocol, the client and server use version numbers to differentiate between cached data objects for which the client has missed messages and unchanged, coherent data. Lock reassertion enhances the performance of clients recovering from disconnection or software errors. For data locks, reassertion is not a correctness requirement; clients can always discard all of their cached data and locks and start anew. Instead, using lock reassertion, a client validates the data currently held in its cache and avoids the time that rereading this data from disk requires. The advantage of lock reassertion is improving recovery time. While important, this is usually less important than system correctness, availability of data to other clients when a failure is detected, and performance during normal operation.

The present reassertion protocol hardens no information during regular system operation, i.e. writes no data to nonvolatile storage, and incurs no significant runtime penalty over managing locks without reassertion. Many conventional version-based recovery schemes, such as log sequence numbers in database logs and version-based replication protocols, harden (store in a nonvolatile memory) version numbers for every change in system state. The present lock reassertion protocol maintains correctness while limiting nonvolatile writes to system restart and error conditions. Version numbers and lock state only need to be hardened when a server restarts, after failure or reboot, and when a client fails to renew its lease.

Since versioning locks allows lock state to survive server failures and network partitions, some data must be hardened. However, the present system only hardens version data during exceptional circumstances to avoid the runtime overhead of writing data to disk. Each lock granted by the lock and metadata server has a version number that is segmented into a hardened and volatile portion. The lock version (E, C) consists of an epoch number E and an intra-epoch counter C. The server increases the epoch number every time it restarts. A single epoch describes a period over which the server's volatile lock state correctly describes the client lock state. When rebooting, the server increments the epoch, outdating locks from the prior epoch. On a server restart, be it due to software error or reboot, the volatile lock state held at the server is lost. By changing the epoch, the server invalidates any outstanding locks from the prior epoch without a record of outstanding locks. Any such outstanding locks must now go through the reassertion protocol, allowing the server to gain knowledge of their existence.

The intra-epoch counter allows the client and server to determine the latest version of a lock and the valid view of its file during an epoch. It increases monotonically over the course of an epoch. The server increments the intra-epoch counter for a file whenever a new lock that allows a client to modify data is given out. Incrementing the counter for every new lock that allows data to change means that every time a file gets written by a new client, the file has a new version number. Many locks that do not permit data to be modified, e.g. S locks, can be given out at the same counter value, even if they are not held concurrently.

When the server fails to communicate with a client about an update to a file lock or a change to the metadata for a file, the lock state or metadata held by that client is considered stale. In this event, the server writes non-volatilely to its local storage a current version number of that file. This write hardens the invalid version (IV) which is used to prevent the isolated client from reasserting this lock. The IV must be hardened so that the lock cannot be reasserted after a server fails, losing volatile lock state. The server sends updates that inform clients with outstanding locks for that file of the new incremented counter. Outside of the hardened epoch, IVs are the only nonvolatile writes required for the reassertion protocol.

The server writes IVs only for the files/locks for which clients miss messages, lazily revoking clients locks. As an alternative, the server could write IVs for outstanding locks held by a client on the premise that a single large write is more efficient than the many small writes that occur if the client fails to recover quickly. The choice of which alternative to use will depend workload. Writing IVs in batch would affect the reassertion protocol, which is only correct for writing IVs for missed messages.

Whenever a client experiences a failure in which the volatile contents of its memory are preserved, the client attempts to reassert all of the locks that it held when its last valid lease expired. For all locks that could not be reasserted, the client invalidates and discards cached data. Reassertion cannot address all failures. In particular, it cannot help recovery when clients lose state on client reboot or hardware failure. However, client cache data structures survive many client software errors, networks partitions and any server error. A client attempts to reassert its locks by sending to the granting server a reassert request for every lock it holds that is not held under a currently valid lease. Servers reply by granting reassert requests when the reasserted lock conforms with current system state or by denying the requests when conflicting locks on the same file are outstanding or the clients holds an old version of the data.

The server's portion of the reassertion protocol, resolving the validity of old locks held under timed-out leases, varies depending upon whether or not the server has failed and restarted. A failed server does not hold valid data on current client lock state and acts more conservatively when granting new locks.

A server that holds valid volatile client lock state allows a client to reassert a lock that meets the criteria:
1. no conflicting locks are outstanding
2. the epoch and counter of the reasserted lock are equal to the current version of that file.

For these conditions to be adequate, the client and server must correctly run a suitable cache coherency protocol. Suitable, in this case, means that the server always keeps global system state in accord with lock sharing semantics. The server and client cooperate using cache coherency and leases to guarantee that no conflicting locks are both valid and outstanding at the same time.

The server has valid lock state information over any given epoch. Condition 2 ensures that the reassertion requests can legally be compared to the current locks state, because the epochs are the same. Were the reassertion request to contain a lock version from a previous epoch, the server rejects it immediately because it no longer has knowledge of file versions or outstanding locks from old epochs. The condition also ensures that the contents of the data have not changed. If the reassertion version matches the file version, the client cache holds the proper data.

Condition 1 ensures that all outstanding locks would be compatible with the reasserted lock. When a client loses its lease, all of its locks are questionable and must be reasserted. Only a few of the isolated client's locks were rendered invalid by the server granting new locks that conflicted with held locks. By checking the reasserted lock against current lock state, the protocol detects such situations and denies reassertion even when the cache holds current data.

A reassertion request can sometimes be granted even when incompatible locks are outstanding. This arises when the server has a method to revoke outstanding incompatible locks. For example, consider that an isolated client holds a timed out X lock with the current file version that it attempts to reassert and other clients hold S locks. The server can demand the S locks and grant the X lock, which is preferred as reassertion prevents an additional read. This does not apply to non-preemptible locks, like file access locks.

Even when a server has failed, having no information about client lock state, lock reassertion is possible. After a failure, a server has only the hardened data it wrote from the previous epoch which includes all IVs and the prior epoch number. The server also relies on the correctness of the cache coherency protocol for reassertion in this scenario.

After a server restarts, but before it begins serving client data, the server conducts a reassertion period. The first task is to write a new epoch number in nonvolatile storage. During the reassertion period, clients reassert locks from the previous epoch. The clients inform the server of the correct lock state from the last epoch. The server exchanges all valid old locks, for locks from the current epoch, and clients are able to retain cached data. Once the reassertion period closes, all valid locks are renumbered for the current epoch, and new lock requests are allowed. Any remaining locks from the previous epoch are no longer useful.

During the reassertion period, locks may be reasserted if they meet the following criteria:

1. the lock epoch is one less than the current epoch
2. no IV for the file on which the lock is requested is greater than or equal to the lock's counter The first condition ensures that any lock being reasserted is from the previous epoch and therefore eligible for reassertion. The second condition ensures that it was a valid lock at the time the server lost its volatile lock state. The server hardens an IV when a client misses a message. For all versions later than the last written IV, the client lock state is globally consistent. The last statement is true because the server only steals locks after writing an IV and all locks, except stolen locks, are mutually consistent.

At the end of the reassertion period some, not necessarily all, valid locks at the end of the previous epoch are reasserted. The reasserted locks are renumbered and valid for the new epoch. Any locks that were not reasserted are immediately invalid and the cached data for those locks must be discarded. For reassertion based on IV, a system may prohibit a lock to be reasserted, even when the lock corresponds to a correct data view and is consistent with system state. Lock reassertion by version number permits many more locks to be reasserted. While restrictive, reassertion based on IVs does allow some locks and cache state to be regained on a limited amount of lock state.

Figure 6:
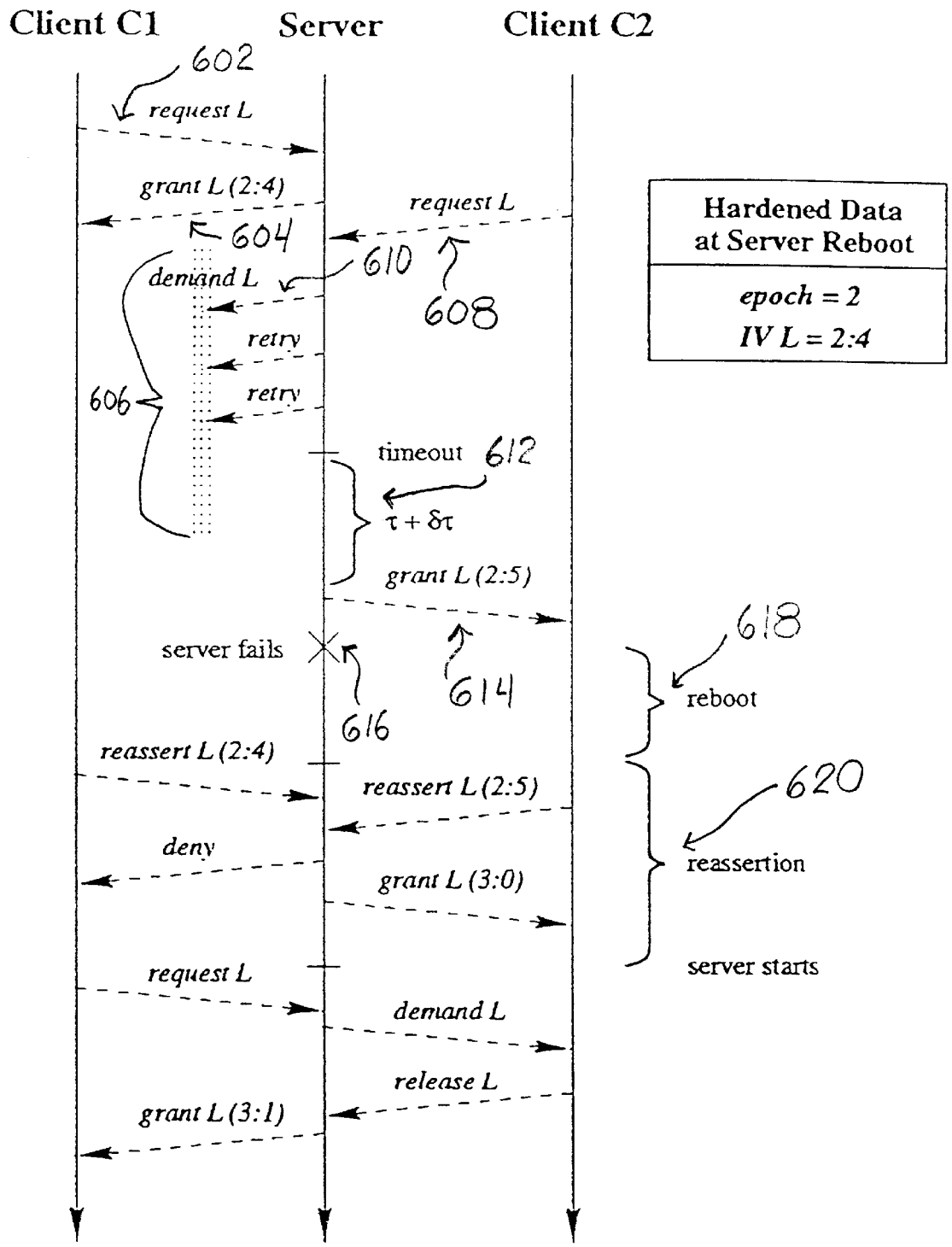
FIG. 6 is a flow diagram showing an operational example of the lock reassertion protocol after a server failure.

An example that includes both a network partition and a server failure, showing the operation of the lock reassertion protocol, is illustrated in FIG. 6 which shows the reassertion protocol after a server failure. For this example, two clients, C1 and C2, vie for an exclusive and preemptible lock on a single file L. After a failure, the server uses its hardened state to resolve between invalid and valid reassertion requests.

The first client C1 requests 602 and obtains lock L from the server (by way of a grant 604) which includes a version number. In this case the epoch and counter are (2:4). C1 almost immediately enters a network partition 606 with respect to the server S and the other client C2. When C2 gains interest in the file and requests L (at 608), the server attempts to obtain the lock on its behalf and demands the lock from C1 (at 610).

The server gets no response from partitioned C1 and begins a timeout 612, waiting for C1's lease to expire. After a suitable time-out interval (t+dt), the server steals the lock and grants it to C2 (at 614). C2 receives a lock with the version number incremented. As previously discussed, when stealing a lock, the server increments the version number to invalidate the previously held lock.

Before granting the lock to C2, the server writes the invalid version (IV) of the stolen lock (2:4) to hardened (nonvolatile) storage. This prevents this invalid lock from being reasserted in the unlikely event of a server crash 616, which in this example happens immediately. After a reboot 618, the crashed server has lost all volatile information, like the version numbers and type of outstanding locks, and only knows the epoch number and the IVs from the previous epoch. Before serving new locks and metadata, the server writes out the new epoch, 3, and conducts a reassertion period 620, allowing clients to reassert locks, validating the contents of their caches. The first message, from client C1 attempts to reassert lock L with version (2:4). This lock request meets the first reassertion criterion, being from the previous epoch, but fails the second, having a version greater than the hardened IV. By having written a hardened IV in the previous epoch, the server determines, without knowledge of outstanding lock state, that the requested reassertion represents a stolen lock.

The next reassertion requests for version (2:5) meets both reassertion conditions. The server grants the request and renumbers the version on the lock for the current epoch (3:0). Eventually, the reassertion period ends and the server begins serving new locks normally. Further requests reasserting locks from epoch 2 would be denied, even if a request represents a consistent lock and a good version of data.

Lock reassertion allows clients to retain the contents of the metadata and data caches after many types of system failure. By revalidating caches, clients avoid the overhead of rereading data from disk and performing metadata transactions with a server when the client already holds the correct information. The actual performance improvement will depend on network, server, and storage system parameters.

Lock reassertion in the present system advantageously support the reassertion of locks after a server failure even though no lock state information is hardened. Furthermore, the server does not require the version numbers for the reassertion protocol to be hardened. Three techniques allow the server to reassert locks in the client server environment:

- segmenting of the version number into a hardened epoch and a volatile counter
- integrating lock reassertion into the server restart process
- hardening invalid versions when clients fail to receive messages Advantageously, the present system minimizes the overhead for lock reassertion by limiting hardened data.

In general, the invention also comprises data and instructions which, when read, interpreted, and executed by the system components, cause the system components to perform the method steps of the present invention. The data and instructions are generally embodied in and readable from a device, carrier or media, such as memory, data storage devices, and remote devices coupled to the system via data communications devices. However, those skilled in the art will recognize that the exemplary environment and components illustrated are not intended to limit the present invention. Thus, the present invention may be implemented as a method, apparatus, or article of manufacture using standard programming and engineering techniques to produce software, hardware, firmware, or any combination thereof. In addition, the term "article of manufacture" as used herein is intended to encompass logic and data embodied in or accessible from any device, carrier, or media.

In the foregoing description of the preferred embodiment, reference is made to the accompanying drawings that form a part hereof, and in which is shown by way of illustration a specific embodiment in which the invention may be practiced. It is to be understood that other embodiments may be utilized and that structural and functional changes or other modifications and variations may be made without departing from the scope of the present invention. The description of the preferred embodiment has been presented for the purposes of illustration and description, and is not intended to be exhaustive or to limit the invention to the precise form disclosed. It is intended that the scope of the invention be limited not by this detailed description but rather by the claims appended hereto in which reference to an element in the singular means "at least one".

What is claimed is:

1. A computer program product comprising a machine-readable medium including machinxecutable instructions therein for ensuring data consistency in a distributed system in the presence of failures, comprising the steps of:

establishing a lease based protocol in said distributed system wherein a client may hold a lease with a server, wherein said lease represents a contract between said client and said server in which said server promises to respect said client for a period of time and wherein said server respects said contract even when said server detects a partition between itself and said client; and renewing said lease in response to a client initiated message that has been acknowledged by said server, said client initiated message being other than a request for a lease renewal, wherein said lease based protocol executed by said client includes four phases:

a first phase in which said lease protects access to all data objects locked on said server and during which any new message ACK received renews said lease;

a second Phase, entered into in response to said client not receiving a message acknowledgement in said first phase, during which said client attempts to obtain a new lease by sending said server a keep-alive protocol message and during which said client continues to service file system requests on behalf of local processes;

a third phase, responsive to failure to attain said lease in said second phase, wherein said client stops servicing file system requests on behalf of said local processes but continues in-process file system transactions; and a fourth phase, responsive to a failure to recover said lease during said third phase, wherein any dirty pages protected by locks held with said server for which said lease expires are flushed out to storage.

2. A method for ensuring data consistency in a distributed system in the presence of failures, comprising the steps of:

establishing a lease based protocol in said distributed system wherein a client may hold a lease with a server, wherein said lease represents a contract between said client and said server in which said server promises to respect said client for a period of time and wherein said server respects said contract even when said server detects a partition between itself and said client; and renewing said lease in response to a client initiated message that has been acknowledged by said server, said client initiated message being other than a request for a lease renewals wherein said lease based protocol executed by said client includes four phases:

a first phase in which said lease protects access to all data objects locked on said server and during which any new message ACK received renews said lease;

a second phase, entered into in response to said client not receiving a message acknowledgement in said first phase, during which said client attempts to obtain a new lease by sending said server a keep-alive protocol message and during which said client continues to service file system requests on behalf of local processes:

a third phase, responsive to failure to attain said lease in said second phase, wherein said client stops servicing file system requests on behalf of said local processes but continues in-process file system transactions; and a fourth phase, responsive to a failure to recover said lease during said third phase, wherein any dirty pages protected by locks held with said server for which said lease expires are flushed out to storage.

3. The method of claim 2, wherein said server maintains no state information concerning client failures except in response to detection of a partition.

* * * * *